May 15, 1951  W. C. SMITH  2,553,427
LAMINATED FABRIC BONDED WITH AN IMPROVED HYDROCARBON
INTERPOLYMER CEMENT, AND THE CEMENT
Filed May 12, 1945
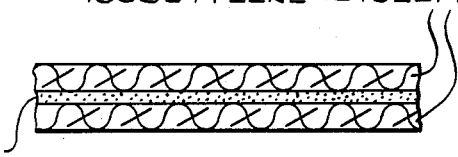
FABRIC RUBBERIZED WITH
ISOBUTYLENE-DIOLEFIN COPOLYMER
CEMENT
COMPRISING ISOBUTYLENE-
DIOLEFIN COPOLYMER AND
HYDROGENATED ROSIN
Winthrope C. Smith  Inventor
By Peter H. Smolka  Attorney

Patented May 15, 1951

2,553,427

UNITED STATES PATENT OFFICE 2,553,427

LAMINATED FABRIC BONDED WITH AN IMPROVED HYDROCARBON INTERPOLYMER CEMENT, AND THE CEMENT

Winthrope C. Smith, Elizabeth, N. J., assignor to Standard Oil Development Company, a corporation of Delaware Application May 12, 1945, Serial No. 593,537

6 Claims. (Cl. 154—50)

This invention relates to synthetic rubber structures; relates particularly to structures and methods involving the adhesion of portions of the copolymer of isobutylene with a polyolefin to each other; and relates especially to means for increasing the adhesivity of the copolymer.

It has been found possible to produce an excellent substitute for rubber, or a synthetic rubber, by the steps of cooling a mixture of isobutylene with a polyolefin having from 12 to 14 carbon atoms to a temperature with the range between 0° C. and —164° C. and treating the mixture at the low temperature with a polymerization catalyst in the form of a Friedel-Crafts type catalyst in solution in a low-freezing, non-complex-forming solvent. The resulting polymer is curable with sulfur and a variety of other substances to yield a highly elastic solid of good strength and excellent elongation.

Considerable difficulty however is experienced in the plying or otherwise joining together of portions of this polymer, both when the polymer is uncured and when the polymer has been cured; and difficulties are particularly troublesome when the polymer has been calendered into and onto fabric, or between layers of fabric, and cured.

The present invention provides means for increasing the adhesivity of the polymer both before and after curing to permit of the convenient and easy assembly of portions of polymer into completed structures. Particularly in the manufacture of proofed goods such as waterproof clothing, containers made from rubberized cloth, boots, shoes, and the like, it is essential that the various-shaped fabric portions be firmly joined together to make a stout, unitary structure; and difficulty has been encountered in obtaining satisfactory adhesion between the various elements of polymer, both during assembly and after curing the assembled article.

In the accompanying drawing a cross-section of a laminated structure is shown comprising two layers of rubberized fabric joined together in accordance with the present invention by means of an intermediate cement layer which contains a rubber-like isobutylene-diolefin copolymer and hydrogenated rosin.

The present invention provides a new process by which increased adhesivity is obtained, to yield a new and much stronger unitary structure. Broadly, the invention utilizes with an isoolefin-diolefin interpolymer, a substantial portion of rosin or other resin which has been hydrogenated or otherwise modified, in a cement solution containing also curing agents, to improve the adhesiveness between the various structural elements. Other objects and details of the invention will be apparent from the following description:

The raw material of the present invention is an olefinic interpolymer. This polymer is prepared from a mixture of an isoolefin which is preferably isobutylene, but may, on occasion, be other isoolefins up to about 8 or 9 carbon atoms; with a polyolefin, or multi olefin having from 4 to 12 or 14 carbon atoms per molecule. The preferred multi olefins are conjugated diolefins of 4 to 6 carbon atoms such as butadiene, isoprene, dimethyl butadiene, as well as substances such as dimethallyl, myrcene, and the like; the choice of multi olefin being determined by the conditions of polymerization, the use to which the polymer is to be put, and many other factors. To the present, it is found that any olefin having two or more double linkages and a carbon number up to about 14 is useful and effective; the exact placing of the unsaturation and the number of double bonds being either immaterial or of minor consequence.

This olefinic mixture is then cooled to a temperature within the range between 0° C. and —164° C.; preferably within the range between —40° C. and —103° C. These temperatures are readily obtained by a proper choice of cooling agent. Liquid propane sets a temperature of —40° C.; solid $CO_2$ sets a temperature of —78° C.; liquid ethane, a temperature of —88° C.; liquid ethylene, a temperature of —103° C., and liquid methane, a temperature of —164° C. These substances, as listed, may be utilized as cooling agents either in a refrigerating jacket surrounding the reactor; or by direct admixture with the olefinic material. If a refrigerating jacket is used, many other refrigerants are available; and the temperature in either case can be adjusted to a considerable extent by the use of pressure or vacuum to raise or lower the effective boiling temperature. In some instances, also, a diluent may be used which may be both diluent and refrigerant, or may be a higher boiling diluent as such. For this purpose, such substances as the halo hydrocarbons and the higher boiling paraffinic hydrocarbons may be used. Representative diluents are ethyl and methyl chloride, carbon disulfide, hexane, heptane, octane, or mixtures thereof, or even low boiling naphtha.

The polymerization is conducted at the desired low temperature by the application, to the olefinic material, of an appropriate Friedel-Crafts catalyst. With simple butadiene, this catalyst must be in solution in a low-freezing, non-complex forming solvent. It is not necessary that the catalyst solvent be liquid at the polymerization temperature, but it is necessary that it be liquid at a temperature not too far from the polymerization temperature, so that an undue amount of heat will not be introduced by the catalyst solvent.

For the catalyst per se, substantially any of the Friedel-Crafts catalyst disclosed by N. O. Calloway in his article on the "Friedel-Crafts Synthesis" printed in the issue of "Chemical Reviews," published for the American Chemical Society at Baltimore in 1935 in volume XVII, No. 3, the article beginning on page 327, the list being particularly well shown on page 375, may be used, although the preferred catalysts are aluminum chloride, aluminum bromo chloride, aluminum oxy chloride, titanium tetra chloride, or boron trifluoride. The solid catalysts as such are inactive in the mixture, since their solubility therein is extremely low and the rate of solution is also low.

For the catalyst, any liquid which does not react with the Friedel-Crafts catalyst; which dissolves a significant amount of the catalyst, in excess of about .3% and forms no complex with the catalyst is useful, provided its freezing point is below 0° C., thereby being low-freezing. The catalyst solvent must be non-complex forming, meaning thereby that it will vaporize away from the Friedel-Crafts catalyst substance without significant change in boiling point from the boiling point of the pure solvent; one or 2 degrees being the maximum allowable temperature change. With butadiene, it is necessary that a dissolved catalyst be used such as aluminum chloride or aluminum bromo chloride, or aluminum oxy chloride. Boron trifluoride in solution in ethyl or methyl chloride or liquid ethylene is useable with butadiene, but gaseous boron trifluoride is not useable, since it does not yield a solid curable polymer. With most of the other diolefins when admixed with isobutylene, any of the above-mentioned catalysts may be used, including gaseous boron trifluoride.

The catalyst may be added to the cold olefinic mixture in any convenient way such as in the form of a finely divided spray applied to the surface of the rapidly stirred, cold, olefinic mixture, or in the form of a fine high pressure, high speed jet into the body of the rapidly stirred olefinic material or by other means which will be obvious to those skilled in the art.

The polymerization proceeds rapidly to yield a solid polymer which, as produced, may have a Staudinger number (molecular weight by the Staudinger method) ranging from about 30,000 to about 80,000. These are the limits of the preferred range. The polymer may, however, be produced with a molecular weight ranging from about 20,000 or 25.000 up to 250,000, or even higher, depending upon the polymerization temperature, the purity of the olefinic material, and the catalyst chosen.

The polymer shows an iodine number (according to the Wijs method) ranging from 0.5 to about 50, the preferred range being from about 1 to 10 or 15. The polymer, in spite of its low unsaturation, is found to be reactive with curing agents, such as sulfur, especially in the presence of a sulfurization aid such as Tuads (tetra methyl thiuram disulfide) or the like; or with para quinone dioxime, particularly in the presence of an oxidizing agent such as lead dioxide, or in the presence of an aromatic dinitroso compound, or the like. Before curing, the polymer is quite plastic, and with a relatively low elasticity. After curing, the polymer shows a definite elastic limit, a tensile strength at break ranging from 1500 to 4500 pounds per square inch, an elongation at break ranging from 600 to 1200%, and many other valuable properties.

The polymer is readily calendered onto fabric and it permeates the fibres of the fabric quite readily, yielding an excellent proofed fabric, which is readily cured by sulfur and heat, or other means.

However, difficulty is experienced in obtaining satisfactory adhesion between various layers or members having surfaces at which the polymer adheres. This is particularly the case with proofed goods such as waterproof or gas-proof clothing, rubber boots, gum shoes, and the like.

According to the present invention the adhesiveness of the polymer is improved by the incorporation into the polymer, in addition to the usual compounding elements, of a substantial portion of an auxiliary "resin" or tackifier which is preferably of relatively low unsaturation, and advantageously hydrocarbon soluble. The preferred component is hydrogenated rosin. In addition, a wide variety of rosin esters are advantageously applicable, especially esters of hydrogenated rosin. Other substances such as modified "Bakelite" (modified phenol-formaldehyde resin) and the like are also advantageous. Instead of using a single auxiliary "resin" I may also use mixtures of resins such as mixtures of an alkyl phenol formaldehyde resin with hydrogenated rosin or with a hydrogenated rosin ester. These resinous addition agents of low unsaturation serve to increase the "tack" of the polymer and to increase its adhesiveness, and to some extent its plasticity; without reducing its tensile strength or curing properties.

It may be noted that resins of high unsaturation having iodine numbers above about 25 are harmful to the tensile strength of the cured polymer and are excluded from the scope of the present invention.

*Example 1*

A sample of polymer was prepared with isoprene as the diolefin, by the methods above outlined (as shown in more detail in U. S. Patent #2,356,128, issued August 27, 1944, to Sparks and Thomas) with a molecular weight of approximately 50,000 and an iodine number of approximately 1.6. This polymer contained approximately 2.45 molecular per cent of isoprene, the remainder being isobutylene in a linear chain structure. This sample was divided into portions and prepared in two separate cement solution pairs according to the following recipes:

|  | Cement I | | Cement II | |
| --- | --- | --- | --- | --- |
|  | Part 1 | Part 2 | Part 1 | Part 2 |
|  | Parts | Parts | Parts | Parts |
| Copolymer | 100 | 100 | 100 | 100 |
| Zinc Oxide | 5 | 5 | 5 | 5 |
| Stearic Acid | 3 | 3 | 3 | 3 |
| Sulfur | 1.5 | 1.5 | 1.5 | 1.5 |
| Quinone Dioxime | 4 | | 4 | |
| Lead Dioxide | | 8 | | 8 |
| SRF Black | | 80 | | 80 |
| Modified Rosin | | | 40 | |

These solution parts were made up in light naphtha of suitable volatility to 10–30% by weight of solids in the cements and a small amount of isopropyl alcohol was added to each as a stabilizer. It may be noted that these are two-part, self-curing cements, and that one of the cements contains modified rosin and the other lacks the rosin. It may be noted that the modified rosin was hydrogenated to a very low iodine number by methods well known in the art.

When the several solutions were prepared, equal parts of the two components of the respective cements were mixed and applied to one inch strips of fabric upon which had been calendered and cured a layer of polymer prepared according to the following recipe:

| | Parts |
|---|---|
| Polymer | 100 |
| Zinc oxide | 5 |
| Stearic acid | 1 |
| Sulfur | 2 |
| Tetramethyl thiuram disulfide | 1 |
| Selenium diethyl dithiocarbamate | 1 |
| Carbon black | 50 |

This recipe was prepared on the mill and calendered hot into the fibres of the fabric and the assembly vulcanized by heat.

One-inch strips of fabric calendered with polymer prepared according to this recipe were then given two coats of the above cements, the coatings being allowed to dry between applications; when fully dry, two pieces of calender-coated fabric were rolled firmly together with the calender-coated, cement-treated surfaces together, and allowed to stand at room temperature until the cement was well cured.

The two strips of fabric were found to be solidly cemented together with an excellent adhesion over the entire cementing and curing time. As soon as the cements were reasonably dry, the full tackiness was developed, and an excellent adhesion was obtained between the two pieces of fabric which had been coated with the cement containing the modified rosin; whereas the adhesiveness of the ordinary cement without the rosin was found to be much lower. Even after curing, the pull required to separate the strips of fabric was about 50% greater for the cement containing the modified resin than for the ordinary cement.

Example 2

Since it is often more difficult to adhere cured surfaces together consisting of polymer compounded with neutral filler, e. g., clay, than it is when compounded with carbon black, a fabric was calendered with a layer of polymer prepared according to the following recipe:

| | Parts |
|---|---|
| Polymer | 100 |
| Zinc oxide | 5 |
| Stearic acid | 1 |
| Sulfur | 2 |
| Tetramethyl thiuram disulfide | 1 |
| Selenium diethyl dithiocarbamate | 1 |
| Neutral filler (clay) | 125 |

This recipe was prepared and calendered on the fabric and cured as in Example 1. One-inch strips of fabric were prepared, cemented with self-curing cement as in Example 1, dried, cured and evaluated. One-inch wide strips cemented with the cement without the modified rosin required a pull of 9 pounds per linear inch to separate the strips of fabric, whereas the sample adhered together by the polymer cement containing the rosin required 12 pounds per linear inch pull to separate them, again showing the gain in adhesiveness obtained by the presence of the rosin.

This procedure further shows the excellent strength of the cement after curing. The gain in "tackiness" and adhesiveness before curing is equally pronounced, and a superior adhesion was obtained as soon as the two samples were placed together.

Example 3

The advantage gained in adhesivity is particularly valuable to adhere uncoated fabric to itself or more particularly when it is desired to adhere doubled polymer coated fabric to itself. Doubled polymer-coated fabric, in which the polymer acts as a waterproof filling between fabric outer layers, presents only fabric surfaces to be bonded for such applications as storm suiting for army and navy use.

Recipes described in Example 1 or 2 were calendered hot into the fibres of one side of the fabric. These polymer coated surfaces were then doubled together by passing two such pieces face to face through the nip of a suitably adjusted calender. The resultant doubled fabric was wrapped on a mandril and cured.

One-inch strips of fabric prepared in this manner were coated with the self-curing cements described in Example 1, dried, rolled together, allowed to cure at room temperature and evaluated.

Strips bonded with cement without the rosin required a pull of 8 pounds per linear inch to separate them, while those containing rosin required 12 pounds per linear inch pull to separate them.

These results further show the excellent tackiness, plasticity and adhesivity of the polymer containing hydrogenated rosin as a cement, particularly on fabric surfaces.

Example 4

The invention is not limited to hydrogenated rosin since it has been found that a considerable range of low unsaturation resins which are hydrocarbon soluble can be used in the polymer to give similarly improved adhesivity both before and after curing.

In non-curing cements of the type used in assembling leather shoes, reduced cold flow and immediate "bite" is of utmost importance, to secure immediate adhesion and non-lifting of cemented parts.

Four portions of the polymer were made up into the following cements:

| | 1 | 2 | 3 | 4 |
|---|---|---|---|---|
| Copolymer | 100 | 100 | 100 | 100 |
| Polyac (poly dinitroso benzene) | 0.4 | 0.4 | 0.4 | 0.4 |
| Polyterpene Resin | | 20 | | |
| Alkyl Phenol-Formaldehyde Resin | | | 20 | |
| Alkyl Phenol-Rosin-Formaldehyde Resin | | | | 20 |

In each case the copolymer was heat treated for 5 minutes with the Polyac by milling on a 300° F. mill, cooled and made up into a 10–20% solid cement in suitable light naphtha or aromatic solvent with or without the resin as indicated.

Pieces of tongue leather four and one-half inches long and one, one-half inches wide, and $\frac{1}{16}$" thick, the long edges of which had been skived to a feather edge were given two coats of these cements, dried well, aand the skived edges were folded over onto themselves ⅛ inch along the entire 4½ inch length. The degree of lifting was observed from time to time. Folds of this type were required to stay cemented with no lifting, for several hours until they can be stitched down.

Results of this test gave the following data:

| Cement No. | 1 | 2 | 3 | 4 |
|---|---|---|---|---|
| Extent of Lifting | All Lifted | 3½" | 4" | None. |
| Time | 5 minutes | 5 hours | 5 hrs. | 5 days. |

Thus the greater adhesivity and strength imparted to thhe copolymer by these resins can be readily seen.

Thus the invention provides a cement containing a low temperature interpolymer of isobutylene with a polyolefin containing a resin material and appropriate solvent, filler, and curing agents to yield an increased adhesiveness to solid bodies of cured polymer.

While there are above disclosed but a limited number of embodiments of the device of the invention, it is possible to produce still other embodiments without departing from the inventive concept herein disclosed and it is therefor desired that only such limitations be imposed on the appended claims as are stated therein or required by the prior art.

The invention claimed is:

1. A curable cement comprising in combination a solid rubbery copolymer of a major proportion of isobutylene and a minor proportion of a conjugated diolefin of 4 to 6 carbon atoms per molecule, said copolymer being characterized by an unsaturation below an iodine number of 50, a molecular weight above 20,000, and curability with sulfur to yield an elastic product, a curing agent, and about 20% by weight based on weight of copolymer of tackifier consisting essentially of a hydrocarbon-soluble resin having an iodine number below 25 and chosen from the class consisting of hydrogenated rosin and hydrogenated rosin ester.

2. A cured laminated structure comprising a plurality of fabric layers having calendered on both sides thereon a vulcanized coating of a solid low-temperature interpolymer of isobutylene with a polyolefin of 4 to 10 carbon atoms, said interpolymer being characterized before vulcanization by a low unsaturation below an iodine number of 50, molecular weight above 20,000 and curability with sulfur to yield an elastic product, and a cured cement between contiguous, coated surfaces of the fabric, the cement comprising in combination a vulcanized solid low temperature interpolymer of a major proportion of isobutylene with a minor proportion of a polyolefin of from 4 to 10 carbon atoms, said interpolymer having prior to vulcanization an unsaturation below an iodine number of 50 a molecular weight above 20,000, and curability with sulfur and having incorporated therein 20% by weight based on weight of copolymer, of tackifier consisting essentially of a hydrocarbon-soluble resin having an iodine number below 25 and being chosen from the class consisting of hydrogenated rosin and hydrogenated rosin ester.

3. A curable cement comprising a solid low temperature interpolymer of a major proportion of isobutylene with a minor proportion of a diolefin having 4 to 6 carbon atoms per molecule, said interpolymer being characterized by an unsaturation below an iodine number of 50 and molecular weighht above 20,000 and curability with sulfur, sulfur, a curing aid and 20% by weight, based on weight of the copolymer, of tackifier consisting of hydrogenated rosin, the whole being in solution in light naphtha.

4. A curable cement comprising a solid low temperature interpolymer of a major proportion of isobutylene with a minor proportion of a diolefin having 4 to 6 carbon atoms per molecule, said interpolymer being characterized by an unsaturation below an iodine number of 50 and molecular weight above 20,000, and curability with sulfur, sulfur, a curing aid, and 20% by weight, based on weight of the copolymer of tackifier consisting of hydrogenated rosin ester, the whole being in solution in light naphtha.

5. A curable cement consisting essentially of 100 parts by weight of a polymer composed of a major proportion of isobutylene and a minor proportion of a diolefin having 4 to 6 carbon atoms per molecule, 5 parts by weight of zinc oxide, 3 parts by weight of stearic acid, 1½ parts by weight of sulfur, 2 parts by weight of quinone dioxime, and 20 parts by weight of hydrogenated rosin.

6. A cured laminated structure comprising a plurality of fabric layers having calendered on both sides thereon a vulcanized coating of a mixture of 100 parts of a solid low temperature interpolymer of isobutylene with a polyolefin of 4 to 10 carbon atoms, 5 parts by weight of zinc oxide, 1 part by weight of stearic acid, 2 parts by weight of sulfur, 1 part by weight of tetramethyl-thiuram disulfide, 1 part by weight of selenium diethyl dithiocarbamate, and 125 parts by weight of a neutral filler, and a cured cement between contiguous coated surfaces of the fabric, the cement consisting of 100 parts by weight of a solid low temperature interpolymer of a major proportion of isobutylene with a minor proportion of a polyolefin of 4 to 10 carbon atoms, 5 parts by weight of zinc oxide, 3 parts by weight of stearic acid, 1½ parts by weight of sulfur, 2 parts by weight of quinone dioxime, and 20 parts by weight of hydrogenated rosin.

WINTHROPE C. SMITH.

REFERENCES CITED

The following references are of record in the file of this patent:

UNITED STATES PATENTS

| Number | Name | Date |
|---|---|---|
| 2,151,382 | Harmon | Mar. 21, 1939 |
| 2,271,474 | Boys | Jan. 27, 1942 |
| 2,349,508 | Mack | May 23, 1944 |
| 2,377,647 | Pragoff | June 5, 1945 |
| 2,397,774 | Buckley | Apr. 2, 1946 |
| 2,431,001 | Sullivan | Nov. 18, 1947 |
| 2,442,083 | Hall et al. | May 25, 1948 |
| 2,451,865 | O'Brien | Oct. 19, 1948 |

FOREIGN PATENTS

| Number | Country | Date |
|---|---|---|
| 112,284 | Australia | Jan. 3, 1941 |
| 112,875 | Australia | Apr. 24, 1941 |